(12) United States Patent
Wobbe et al.

(10) Patent No.: US 7,306,445 B2
(45) Date of Patent: *Dec. 11, 2007

(54) MOLD CLOSING DEVICE FOR AN INJECTION MOLDING MACHINE

(75) Inventors: Hans Wobbe, Herrsching (DE); Walter Wohlrab, Weissenburg (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

This patent is subject to a terminal disclaimer.

(21) Appl. No.: 11/335,986

(22) Filed: Jan. 20, 2006

(65) Prior Publication Data

US 2006/0113703 A1 Jun. 1, 2006

Related U.S. Application Data

(60) Division of application No. 10/770,124, filed on Feb. 2, 2004, now Pat. No. 7,018,189, which is a continuation of application No. PCT/EP02/07985, filed on Jul. 18, 2002.

(30) Foreign Application Priority Data

Aug. 3, 2001 (DE) ................. 101 38 087

(51) Int. Cl.
*B29C 45/04* (2006.01)
(52) U.S. Cl. ............ 425/112; 425/130; 425/576; 425/588
(58) Field of Classification Search .......... 425/112, 425/130, 134, 576; 264/255
See application file for complete search history.

(56) References Cited

U.S. PATENT DOCUMENTS 3,224,043 A 12/1965 Sieben et al.
3,880,560 A 4/1975 Takahashi
4,014,974 A 3/1977 Cessna, Jr.

(Continued)

FOREIGN PATENT DOCUMENTS

AT 003 798 U1 7/2000

(Continued)

OTHER PUBLICATIONS

Database WPI Section Ch, Week 197813, Derwent Publications Ltd., London, GB; Class A32, AN 1978-24150A XP002324684 & JP 53-016074 A (Japan Steel Works Ltd), Feb. 14, 1978.

*Primary Examiner*—James P. Mackey
(74) *Attorney, Agent, or Firm*—Henry M. Feiereisen; Ursula B. Day

(57) ABSTRACT

A mold closing device of an injection molding machine for producing plastic parts made of two or more plastic components includes a central mold carrier element which is arranged between two outer mold mounting plates and has two or four opposing mold mounting areas arranged in pairs for affixing two or four mold halves and which is fitted with a turning device supported in a supporting frame. Each of the mold halves of the mold carrier element can be closed against the mold halves of the outer mold mounting plates by a drive mechanism and a mold pressure unit. The outer mold mounting plates are interconnected by columns which extend through the supporting frame for the central mold carrier element. The supporting frame is fixedly connected to the machine frame while the outer mold mounting plate is displaceably supported on the machine frame.

7 Claims, 4 Drawing Sheets

U.S. PATENT DOCUMENTS

| | | | |
|---|---|---|---|
| 4,243,362 A * | 1/1981 | Rees et al. .................. 425/130 |
| 4,330,257 A | 5/1982 | Rees et al. |
| 4,726,558 A * | 2/1988 | Ozone et al. .............. 248/68.1 |
| 4,734,023 A | 3/1988 | Nesch et al. |
| 5,026,265 A * | 6/1991 | Kanai et al. ................ 425/130 |
| 5,145,353 A | 9/1992 | Zakich |
| 5,773,049 A | 6/1998 | Kashiwa et al. |
| 5,904,887 A * | 5/1999 | Nakamura et al. .......... 264/255 |
| 6,139,305 A | 10/2000 | Nesch |
| 6,558,149 B1 | 5/2003 | Bodmer et al. |
| 6,613,262 B1 | 9/2003 | Arend |

FOREIGN PATENT DOCUMENTS

| | | |
|---|---|---|
| DE | 10 09 484 | 5/1957 |
| DE | 24 26 883 A | 12/1974 |
| DE | 36 20 175 C2 | 5/1989 |
| DE | 296 11 733 U | 9/1996 |
| DE | 43 25 180 C2 | 10/1996 |
| DE | 196 50 854 C | 3/1998 |
| DE | 197 10 412 A1 | 9/1998 |
| DE | 197 33 667 A1 | 2/1999 |
| DE | 199 62 759 C1 | 4/2001 |
| EP | 0 794 045 A1 | 9/1997 |
| FR | 22 94 041 | 7/1976 |
| FR | 2 372 019 A | 6/1978 |
| GB | 23 00 142 A | 10/1996 |
| JP | 55-071541 A | 5/1980 |
| JP | 62-060618 A | 3/1987 |
| JP | 06-254906 A | 9/1994 |
| WO | WO 97 48 540 A1 | 12/1997 |
| WO | WO 98/23431 * | 6/1998 |
| WO | WO 00 12284 A | 3/2000 |
| WO | WO 01 47 686 A1 | 12/2000 |

* cited by examiner

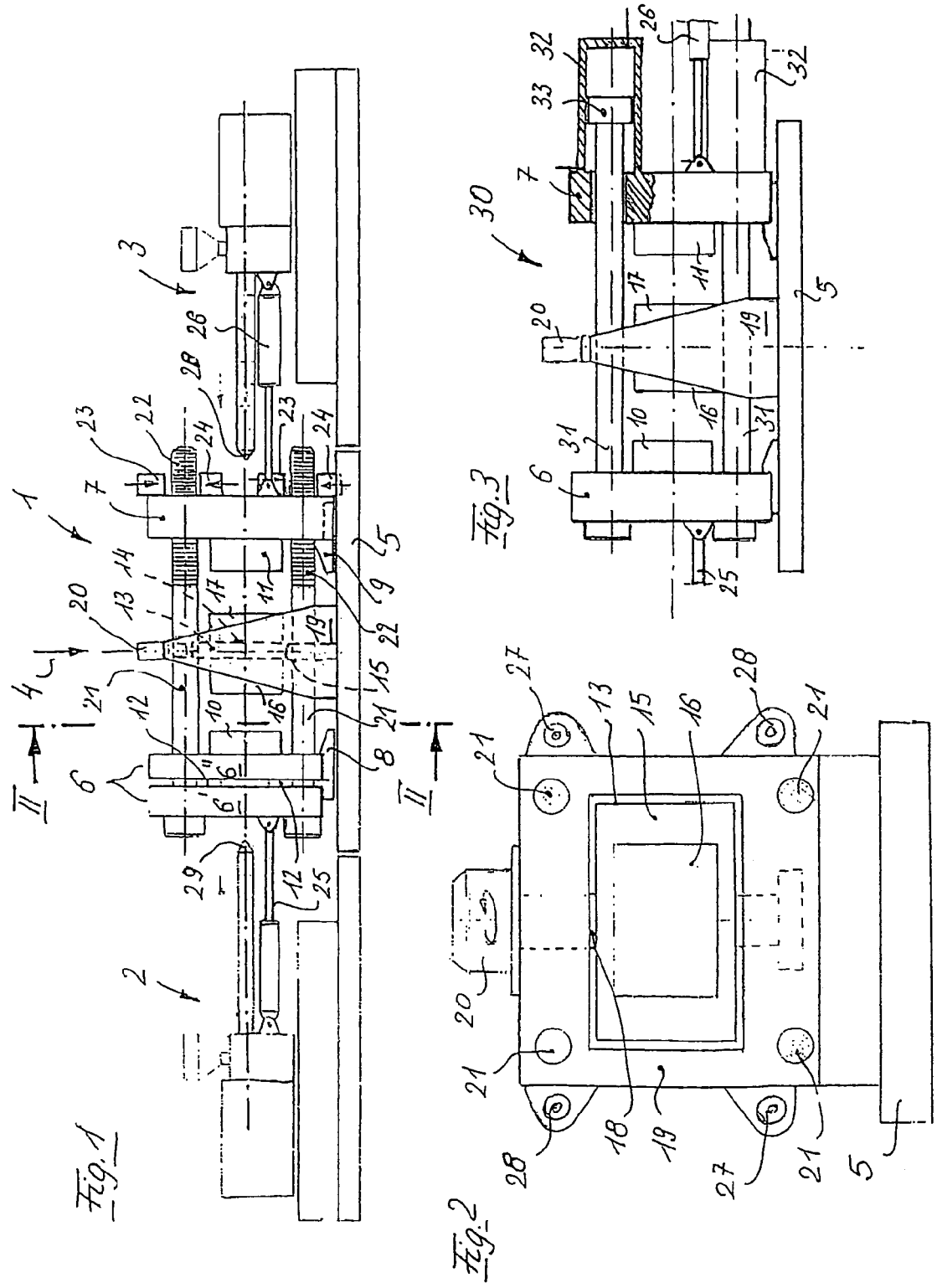

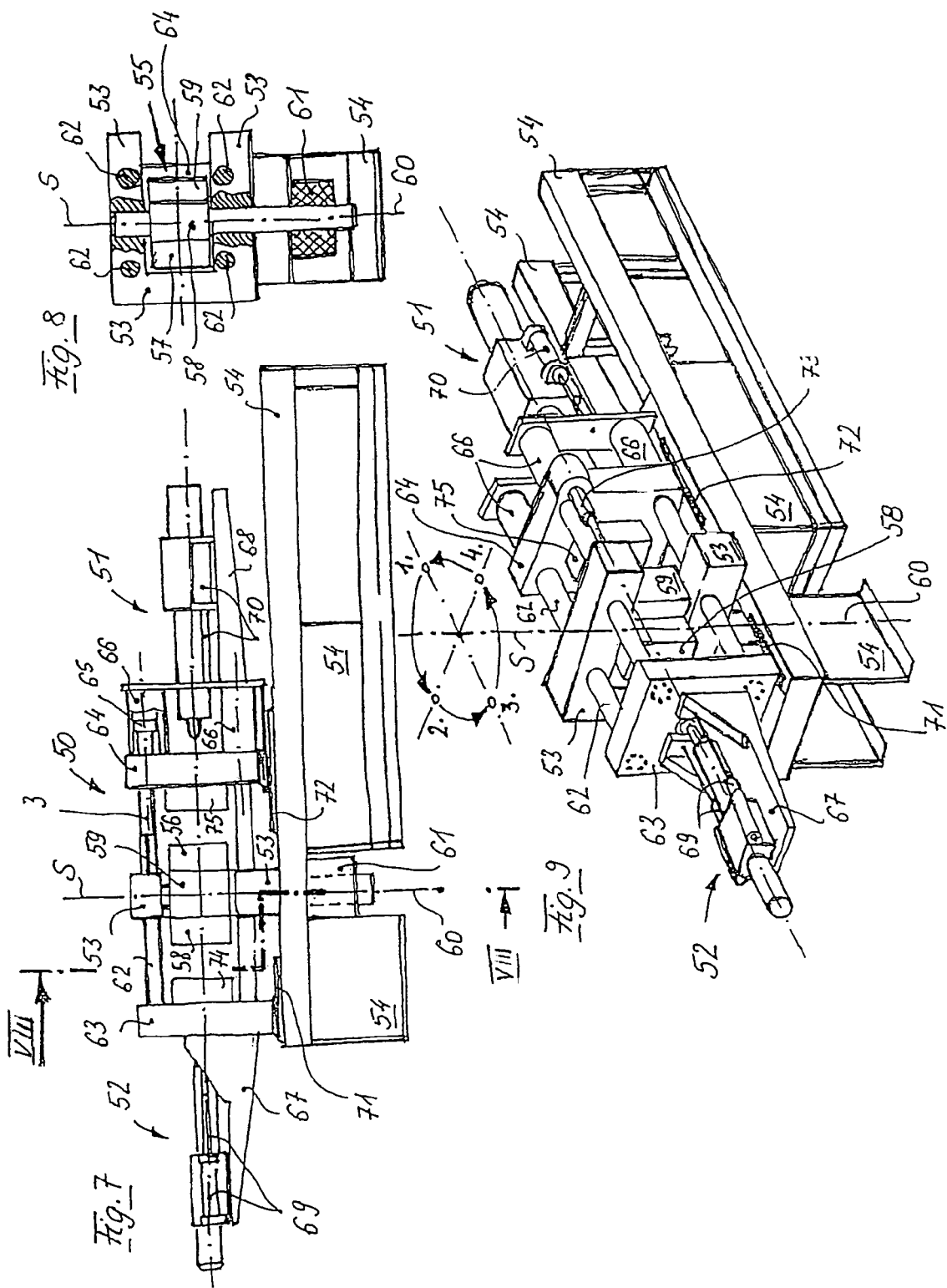

MOLD CLOSING DEVICE FOR AN INJECTION MOLDING MACHINE

CROSS-REFERENCES TO RELATED APPLICATIONS

This application is a division of prior filed U.S. application Ser. No. 10/770,124, filed Feb. 2, 2004, now U.S. Pat. No. 7,018,189, which is a continuation of prior filed copending PCT International application no. PCT/EP02/07985, filed Jul. 18, 2002, which designated the United States and on which priority is claimed under 35 U.S.C. §120, and which claims the priority of German Patent Application, Serial No. 101 38 087.9, filed Aug. 3, 2001, pursuant to 35 U.S.C. 119(a)-(d), the contents of which are incorporated herein by reference.

BACKGROUND OF THE INVENTION

The present invention relates to a mold closing device for an injection molding machine, and more particularly to a mold closing device for producing large high-precision multi-component plastic parts.

Mold closing devices are known in the art. For example, British Pat. No. GB 2 300 142 describes a mold closing device, wherein each of the two outer mold mounting plates is made of one mold mounting plate that is fixedly secured to the machine frame and another mold mounting plate that is movably supported on the machine frame. The center mold carrier element is also movably supported on the machine frame by way of a supporting frame. Because the center mold carrier element which is rotatably arranged in the supporting frame is moveable, this component is relatively unstable, so that typically only lightweight mold halves can be placed on the mold mounting areas of the rotatable mold carrier element. Since the center mold carrier element and the moveable outer mold mounting plate represent two successively arranged moveable mold carrying units, the large tolerances render the mold closing unit very inaccurate, whereby the parallelism between the plates and the stationery outer mold mounting plate which is stationary in the machine frame is difficult to maintain.

Another type of mold closing device is known from German patent publication no. DE 197 33 667, which includes a stationary and a moveable mold mounting plate and a mold half carrier which is supported in support blocks that are moveable relative to the moveable mounting plate and rotatable about a vertical axis. The moveable mold mounting plate and the mold half carrier can be moved towards the stationery mold mounting plate so as to provide a closing pressure when a thermoplastic plastic is injected. This device disadvantageously also suffers from the relative instability of the device due to the large tolerances, as described above with reference to British patent publication no. GB 2 300 142.

German Pat. No. DE 36 20 175 describes an injection molding machine with at least two plasticizing and injection units as well as a stationary mold mounting plate and a moveable mold mounting plate that is guided by stationary tie bars. Each of stationary tie bars carries one set of the mold halves of injection molding molds. A prismatic core carrying body is arranged between the stationary tie bars which can rotate about its axis and is displaceable in the direction of the stationery tie bars. The axis-parallel side faces of the core carrying body include the other set of mold halves of the injection molding molds. This core carrying body is actually not supported on the machine bed, but is held only by tie bars that are movably supported on the moveable mold mounting plate. In other words, only the core carrying bodies and the associated mold halves which are lightweight are operational. This particular support structure of the core carrying body relative to the moveable mold mounting plate, which is not supported on either the machine bed or the tie bars used for the closing motion, causes the device to be particularly unstable and hence has all the disadvantages described above with reference to British patent publication no. GB 2 300 142.

A tie bar pulling device for a 2-platen or 3-platen injection molding machine is described in German patent publication no. DE 197 10 412, wherein the tie bars extend through two mold mounting plates which each carries a corresponding mold half. When the mold is opened, the tie bars are pulled out of one mounting plate with which they are interlocked in the closed state, allowing access to the space between the mold mounting plates. This device, unlike the present invention, is directed to an injection molding machine without a turning device for the mold, which makes it difficult to produce multi-component injection molded parts.

German Pat. No. DE 196 50 854 describes a method and a device for producing multilayer plastic parts, whereby a plastic injection molded part is coated with at least one layer of 2-component Thermosetting plastics and the two components are injection-molded successively in a synchronous cycle in the same mold. For this purpose, a baseplate is used which supports two mold halves that are arranged side-by-side and rotatably supported for rotation about a horizontal longitudinal machine axis. Female molds of an injection molding machine and a RIM device are arranged opposite to the mold halves. After injecting thermoplastic material with the injection molding machine, the baseplate is rotated by 180°. In the following cycle, a new thermoplastic part is molded while the part produced in the preceding cycle is coated with the 2-component Thermosetting plastics. With this device, both injection molding devices are disadvantageously located on the same side of the machine, which poses significant problems at the installation side and for the operation of the injection molding devices. Moreover, this device is suitable only for producing small plastic parts, since the two mold halves could otherwise not be arranged side-by-side. It is not clear from the description how a baseplate that is rotatable about the longitudinal mold axis can be fixedly connected with the female molds of the injection molding machine and the RIM device, which leaves unanswered the question concerning the accuracy of the mold fit and the availability of a sufficiently high closing pressure.

It would therefore be desirable and advantageous to provide a mold closing device with an improved stability, which obviates prior art shortcomings and is able to specifically produce large high-precision multi-component plastic parts.

SUMMARY OF THE INVENTION

According to one aspect of the invention, a mold closing device for producing a plastic part made of two or more plastic components includes two outer mold mounting plates supporting mold halves, a center mold carrier element rotatably arranged between the two outer mold mounting plates, at least one injection unit operatively coupled with one of the outer mold mounting plates and having an injection nozzle, and at least one reaction injection molding (RIM) device operatively coupled with the other one of the outer mold mounting plates and having a mixing head.

According to another advantageous feature of the invention, the RIM device may be implemented as a PUR foaming unit.

According to another advantageous feature of the invention, the center mold carrier element may include two or four opposing mold mounting areas arranged in pairs for affixing two or four corresponding mold halves, with the center mold carrier element further including a turning device capable of closing each of the mold halves of the center mold carrier element against the mold halves of the outer mold mounting plates.

According to another advantageous feature of the invention, a supporting frame may be fixedly connected to a machine frame for rotatably supporting the center mold carrier element, wherein the outer mold mounting plates are constructed for slidable support on the machine frame and movement to and away in relation to the center mold carrier element. When the supporting frame for the center mold carrier element is attached to the machine frame according to the invention, the center mold carrier element can be supported in a more massive and hence more robust rotary device, while on the other hand each of the two outer mold mounting plates moves back and forth directly and with a short displacement, i.e., without an intermediate moveable mold mounting plate, relative to the stationary supporting frame of the center mold carrier element.

According to another advantageous feature of the invention, the center mold carrier element may be plate-shaped and constructed with two mold mounting areas for two center mold halves.

According to another advantageous feature of the invention, the wherein the center mold carrier element may be constructed in the form of a cube and provided with four mold mounting areas for four center mold halves.

According to another aspect of the invention, a mold closing device of an injection molding machine for producing a plastic part made of two or more plastic components includes two outer mold mounting plates supporting mold halves, a center mold carrier element arranged between the two outer mold mounting plates, a C-shaped supporting frame supporting the turning device and includes an opening that is open towards a loading/unloading side of the injection molding machine, a machine frame fixedly connected to the supporting frame and displaceably supporting the outer mold mounting plates.

According to another advantageous feature of the present invention, the support plate and the associated outer mold mounting plate may form a sandwich plate with an interposed hydraulic pressure piston. This plate arrangement has a very short construction and represents a particularly stiff system because the quantity of hydraulic fluid needs to be adequate only for producing the closing pressure. Larger quantities of hydraulic fluid which can increase the compressibility thereby become unnecessary or are only used to operate the actuating drives (closing, loosening and opening), the motion of which is decoupled from the generation of the closing pressure. The aforedescribed two-plate closing system with an interposed center mold carrying unit, which is fixedly supported in the machine frame, further enhances the stiffness of the mold closing device according to the invention substantially. This mold closing device can therefore advantageously be used to produce large multi-component plastic parts which require a highly precise machine, for example automobile glass, interior moldings for automobiles and multi-wall containers.

According to another advantageous feature of the invention, the supporting frame which is stationary in the machine frame can have a C-shape, i.e., can be provided with an opening to the loading/unloading side. In a mold carrier element shaped as a cube and having four mold halves, the basic component can be injection molded in a first cycle, as referenced to one of the four mold halves of the mold carrier element. In the second cycle, this component can cool down. In the third cycle, the basic component is finished into a two-component plastic part. In the fourth cycle, the mold half with the finished two-component plastic part is located in the open section of the C-shaped supporting frame and can be removed during the fourth cycle. Since the removal occurs during the fourth cycle, the cycle time can be significantly shortened. In addition, inserts, for example metallic threaded sleeves or a plastic part, can advantageously be placed into the mold half after the finished two-component plastic part has been removed. Alternatively, the C-shaped frame can be operated so that the basic component is located during the second cycle on the open side of the frame, making it possible to perform an intermediate processing step during the second cycle which otherwise would have to be performed during the first cycle. An exemplary processing step, which typically can occur only after adequate cool-down of the plastic part, can be a surface treatment of the basic component to improve adhesion between the plastic material molded in the following step and the basic component. Such processing step is useful for bonding a thermoplastic basic component with a 2-component Thermosetting plastic coating, in particular a polyurethane coating and other like, and can be performed, for example, by a robot located on the side of the mold closing device. In particular, a mold carrier element with four or six mold halves shortens the cycle time. The open C-shaped supporting frame can also be used with a mold carrier element that has only two mold halves, since the mold mounting areas can be rotated to the open section of the supporting frame to allow a mold change or for maintenance work. The particularly short construction of the mold closing devices of the invention can overcome the more difficult access to the center mold halves associated with this design.

According to yet another aspect of the present invention, a method of producing a plastic part made of two or more plastic components, includes the steps of injection molding a base structure of thermoplastic material with the aid of an injection unit operatively coupled to a first outer mold mounting plate, rotating the injection-molded base structure to face a second outer mold mounting plate, and coating the injection-molded base structure with a coating of 2-component thermoset material using a RIM device operatively coupled to the second outer mold mounting plate.

According to another feature of the present invention, the 2-component thermoset material may be polyurethane.

According to another feature of the present invention, the coating step may involve injection of a PUR reactive mixture and formation of a PUR skin on a surface of the base structure.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 is a side view on an injection molding machine with a mold closing device according to the present invention, FIG. 2 shows a cross-sectional view, on an enlarged scale, of the injection molding machine, taken along the line II-II in FIG. 1, FIG. 3 is a side view on another embodiment of a mold closing device according to the present invention;

FIG. 7 is a side view of an injection molding machine with a C-shaped open supporting frame disposed fixedly in the machine frame, FIG. 8 is a cross-sectional view of the injection molding machine of FIG. 7, taken along the line VIII-VIII of FIG. 7, and FIG. 9 is a perspective view of the injection molding machine of FIG. 7.

DETAILED DESCRIPTION OF PREFERRED EMBODIMENTS

Figure 4:
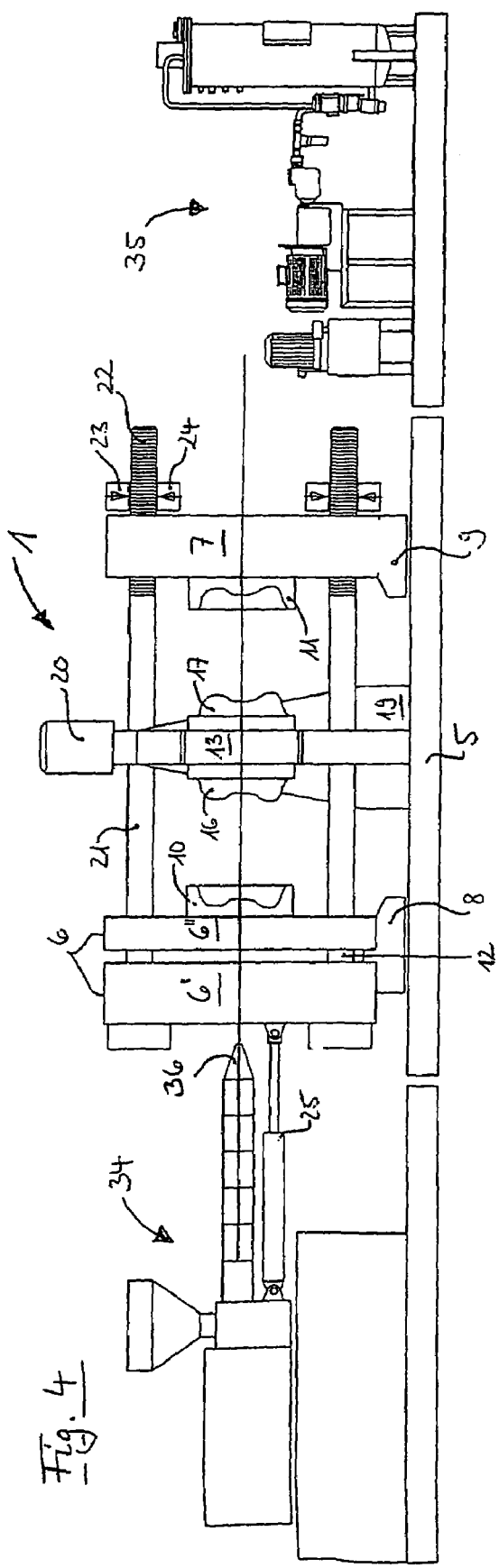
FIG. 4 is a side view on an injection molding machine with the mold closing device of the invention according to the first embodiment with a RIM device.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown an injection molding machine with a mold closing device 1 and two injection units 2 and 3. Arrow 4 indicates schematically the injection axis of a third optional injection unit which can be provided on the injection molding machine in a so-called T-arrangement.

The mold closing unit 1 includes a machine frame 5 on which two outer mold mounting plates 6 and 7 are movably supported by slideways 8 and 9. Each of the mold mounting plates 6 and 7 supports a mold half 10 and 11. The mold mounting plate 6 depicted on the left side of FIG. 1 includes a so-called sandwich plate composed of two parallel plates with a small gap therebetween, wherein one plate is a support plate 6' and the other plate is a mold carrier plate 6". Four hydraulic pressure pistons 12 are disposed between the support plate 6' and the mold carrier plate 6". Only the two front pressure pistons are visible in the drawing.

A center mold carrier element 13 with two opposing mold mounting areas 14 and 15 is disposed between the two outer mold mounting plates. A left and a right center mold half 16 and 17 are each secured to a corresponding mold mounting area 14 and 15. The plate-shaped mold carrier element 13 depicted in FIG. 1 therefore has two mounting surfaces 14 and 15. In principle, the mold carrier element can also be shaped as a cube with four mold mounting areas.

The mold carrier element 13 is supported with a vertically oriented rotation axis 18 in a supporting frame 19 that is fixedly connected with the machine frame 5. A rotary drive 20 disposed of the supporting frame 19 can associate the mold carrier element 14 that holds the two center mold halves 16 and 17 with each of the two outer mold halves 10 and 11.

The two outer mold mounting plates 6 and 7 are connected with each other by four columns 21. The columns 21 are attached to the support plate in the left outer mold mounting plate 6. The columns 21 penetrate the right outer mold mounting plate 7 and are locked behind the same. The locking system includes saw tooth-shaped grooves 22 formed in the end region of the columns 21, with the complementary saw tooth-shaped grooves of two mutually displaceable half-shells 23 and 24 engaging with the grooves 22 like ratchets. The columns 21 penetrate the supporting frame 19 in slideways.

The injection units 2 and 3 are coupled with the outer mold mounting plates 6 and 7 through hydraulic actuating elements 25 and 26 capable of positioning the injection nozzles 29 disposed of the mold mounting plates 6 and 7 into an injection position.

The cross-sectional view of FIG. 2 shows the supporting frame 19 secured on the machine frame 5, with the supporting frame 19 penetrated by the columns 21. The mold carrier element 13 is rotatably supported in the supporting frame 19, with the left center mold half 16 secured to the mold mounting areas 14 of the mold carrier element 13. The rotation axis 18 of the mold carrier element 13 is coupled with the rotary drive 20. Attachment points for hydraulic actuators 27 and 28 (not shown in FIG. 1) are arranged on the outer edge of the supporting frame 19. The hydraulic actuators 27 and 28 can be used to move the outer mold mounting plates 6 and 7 towards and away from the supporting frame that is stationary in the machine frame, and can thereby perform the mold closing motion that brings the mold half 10 of the left outer mold mounting plate 6 into a closing position with the left center mold half 16 of the center mold carrier element 13. In the same way and simultaneously, the mold halves 11 and 17 are brought into a closing position. The two outer mold mounting plates 6 and 7 are moved towards the mold carrier element 16 that is stationary in the machine frame, with the locking system open. The locking system immediately returns to its locking position at the conclusion of the closing motion, with the two half-shells 23 and 24 engaging with the saw toothshaped grooves 22 of the columns 21. The movement into the locking position is indicated in FIG. 1 by the arrows on the half-shells 23 and 24.

Immediate after the system is locked, the pressure piston 12 produces the closing pressure, followed by a first injection process via the injection units 2 and 3 that are docked on the outer mold mounting plates 6 and 7.

After conclusion of the first injection process, the locking system is released and the hydraulic actuators 27 and 28 initially loosen the closed mold halves 10, 12, 16, 17 and subsequently move the outer mold mounting plates 6 and 7 away from the mold carrier element 13 that is stationary in the machine frame, or the supporting frame 19.

The mold carrier element 13 is then rotated by 180°, so that the outer mold halves 10 and 11 face the turned-around center mold halves 16 and 17. With new pairing of the mold halves, the partially injection molded parts produced in the first injection molding process are completed in a following second injection molding process to produce a finished two-component plastic part.

FIG. 3 shows an embodiment of a mold closing device 30 that is different from the mold closing device 1 depicted in FIG. 1, wherein elements performing the same or similar functions are referenced with the same referenced characters as in FIG. 1.

The mold closing device 30 includes a one-piece outer mold mounting plate 6 having two columns 31 attached thereto. The columns 31 penetrate both the supporting frame 19 and the right outer mold mounting plate 7, which has four hydraulic cylinders 32, in which cylinders the ends of the columns 31 which are formed as pistons 33 are reversibly guided. These piston-cylinder units 32, 33 can be used to perform the travel motions of the mold closing device 30, such as opening and closing the mold halves 10, 11, 16, 17. On the other hand, they can also be used to produce the closing pressure. A required pressure boosting device is integrated in the pistons 33 and is not separately shown. Unlike in the embodiment of FIG. 1, the closing pressure is not supported by a locking system, but is maintained hydraulically by the piston-cylinder unit 32, 33. Also, unlike the embodiment of FIG. 1, the functions are not separated. Whereas the closing pressure in the mold closing device 1 of FIG. 1 is produced by the pressure pistons 12 and the travel motion (opening, closing, loosening) is performed by the hydraulic actuators 25, 26, both of these major functions (travel motions and generation of the closing pressure) is performed in the mold closing device 30 by the piston-cylinder unit 32, 33.

Figure 6:
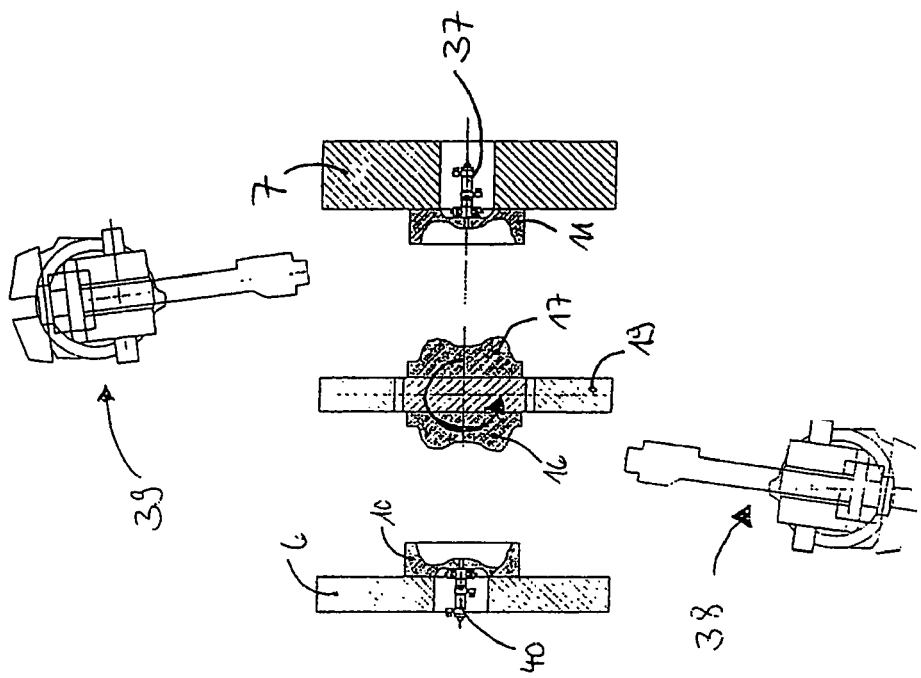
FIG. 6 shows schematically a top view on the mold closing device of the invention with two mixing heads.
Figure 5:
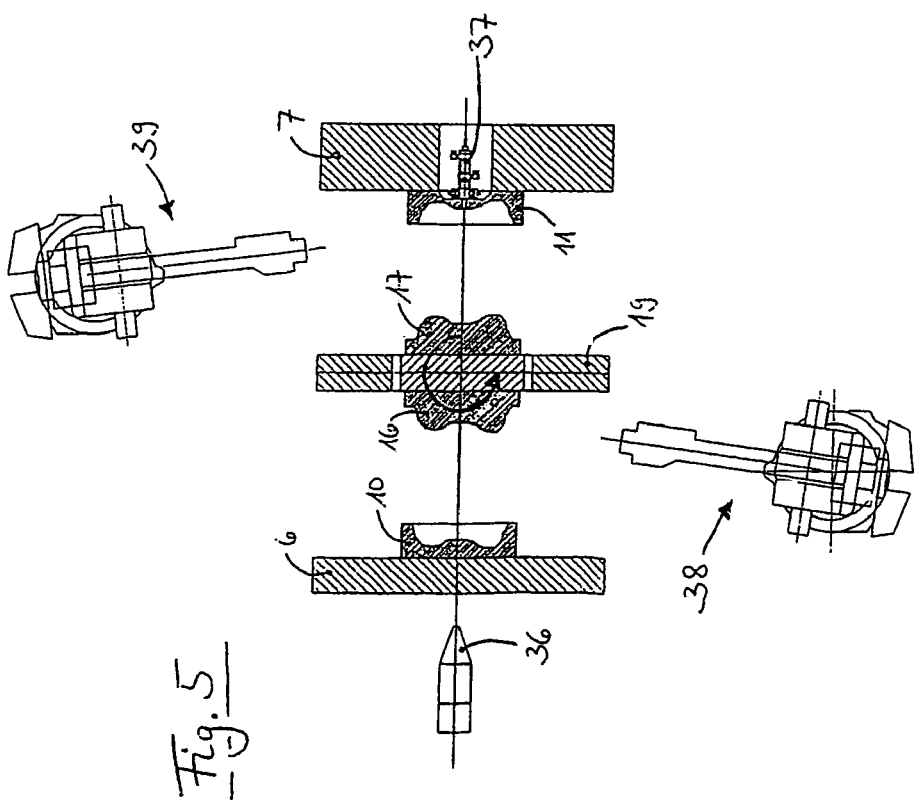
FIG. 5 shows schematically a top view on the mold closing device of the invention with an injection nozzle and a mixing head.

Two possible additional applications for a mold closing device 1 are shown in FIGS. 4 to 6, wherein the same elements have the same referenced characters. FIG. 4 shows the mold closing device 1, with an injection unit 34 coupled to the support plate 6' from the left side via a hydraulic actuator 25. An associated injection nozzle can be positioned on the mold mounting plate 6 in an injection position. A RIM device 35 (RIM: Reaction Injection Molding) is located on the right side of the mold closing device 1 and is used, for example, for processing polyurethane (PUR). This device is known in the art and will not be described in detail. It includes essentially feeder and measuring mechanisms for the chemicals to be processed, such as polyol, poly isocyanate and optional additives. The RIM device is coupled to the mold closing device 1 via a mixing head (not shown in FIG. 4).

FIG. 5 shows schematically a top view of the arrangement of FIG. 4, whereby two possible handling robots 38, 39 are located on either side of the opened mold halves 10, 16 and 11, 17, respectively. These can be a processing robot 38 and a removal robot 39. The RIM device (which is not shown in FIG. 5) is coupled via a mixing head 37 to the right mold mounting plate 7, with this mixing head 37 forming an injection-molding-connection with the right outer mold half 11. With the arrangement depicted in FIG. 4, the basic component is produced as described above. When the molds are open, the surface of the previously molded basic component is machined, which can be done by the processing robot 38. The mold carrier element 13 is then rotated by 180°, whereafter the mold halves are again closed. In the following step, a new basic component is injection-molded on the left side, whereas of the right side the PUR reactive mixture is injected into the mold through the mixing head 37, forming a PUR layer on the surface of the basic component. When the molds are subsequently opened, the finished component can be removed by a removal robot 39 or another removal device, while the surface of the basic component can be simultaneously machined.

FIG. 6 shows schematically an arrangement similar to that of FIG. 5, with the only difference that the left injection unit 34 with the injection nozzle 36 is replaced by an additional RIM device (not shown) which is coupled via a mixing head 40 to the left mold mounting plate 6. This arrangement can be used to manufacture by a similar manufacturing process multi-component plastic parts, wherein both the basic component and the coating are made of PUR.

A mold closing device 30 according to FIG. 3 can advantageously be used to manufacture a multi-component plastic parts that is made at least partially of PUR.

Supporting the closing pressure via the locking system according to the embodiment of FIG. 1 provides a particularly stable system that can tolerate a higher stress, so that the mold closing device 1 according to FIG. 1 is particularly suitable for producing high-precision large-sized multi-component plastic parts.

Conversely, the embodiment of the mold closing device 30 of FIG. 3 is particularly suited for economically producing midsize to small sized multi-component plastic parts.

The injection molding machine according to FIGS. 7 to 9 includes a mold closing device 50 and two injection units 51 and 52. The mold closing device 50 corresponds essentially to the mold closing device 30 of FIG. 3, but uses instead of the closed supporting frame 19 a C-shaped supporting frame 53 which is open to the loading/unloading side of the injection molding machine. The C-shaped supporting frame 53 is fixedly connected with the machine frame 54 and supports a rotatably supported mold carrier element 55, on which four center mold halves 56, 57, 58 and 59 are clamped. The rotation axis 60 of the mold carrier element 55 is supported in both legs of the C-shaped supporting frame 53 and can be driven by a rotary drive 61 arranged in the machine frame 54 to perform the aforedescribed cycle. Four columns 62 guided in slideways extend through the C-shaped supporting frame 53. The four columns 62 are secured on one end in a left outer mold mounting plate 63 and extend on the other end through slideways disposed in a right outer mold mounting plate 64. They are also reversibly guided by pistons 65 moving in four hydraulic cylinders 65. Both outer mold mounting plates 63 and 64 include attachment points 67 and 68 for the injection units 51 and 52, which can be moved by hydraulic actuators 69 and 70 to approach the injection through-passageways of the mold mounting plates 63 and 64.

The outer mold mounting plates 63 and 64 are slidably supported on the machine frame 54 on side rails 71 and 72. The outer mold mounting plate 63 and 64 can therefore be moved by two hydraulic actuators 73 which are located on the two diagonally opposed corners of the mold mounting plate 64. Only the upper actuator is visible in the FIGS. 7 and 9. The left outer mold mounting plate 63 is moved by the hydraulic piston-cylinder unit 65, 66.

The four center mold halves 56, 57, 58 and 59 can be closed cyclically with the mold halves 74 and 75 arranged on the two outer mold mounting plates 63 and 64.

The injection process will be described hereinafter with reference to the operating cycle of the center mold half 56. The four cycle positions 1 to 4 of the cubic mold carrier element 55, which are offset relative to each other by 90°, are indicated in FIG. 9 relative to the rotation axis S. In the first cycle, the two mold halves 56 and 75 are closed and a basic component is injection-molded. In the second cycle, the mold half 55 faces the vertical leg of the C-shaped supporting frame 53. The previously injection-molded basic component can then cool down. In the third cycle, the mold half 56 is closed with the mold half 74 of the left outer mold mounting plate 63, and the basic component is finished into a two-component injection molded part. In the fourth cycle, the mold half 56 is rotated into the opening of the C-shaped supporting frame 53. In this position, the finished two-component injection molded part can be easily removed and inserts can optionally be placed in the empty mold halves 56. In this operating cycle, the part is removed during the cycle as determined by the processes closing, closing pressure build-up, injection, after-pressure phase. No additional time is required for removing the injection molded part. The multi-component injection molding machine can be operated with a shortened cycle time, since the part can be simultaneously removed from the open rotated mold half.

A mold closing device 50 according to FIG. 7 with a C-shaped frame 53 can advantageously also be employed with one or several RIM devices. In this case, the mold half with the basic component can be rotated during the second cycle into the opening of the C-shaped frame 53, whereby the component first cools down and then receives a surface treatment. In the third cycle, the mold half with the basic component is closed against the mold half that is connected with the mixing nozzle, and the component is finished by applying a PUR coating while a new basic component is injection molded on the other side of the supporting frame. During the next mold opening, the finished component is removed and a new cycle begins. Alternatively, the component can be removed during the fourth cycle, which requires sufficient space between the perpendicular leg of the C-shaped supporting frame 53 and the finished component to allow use of a removal device. Alternatively, the processing step can occur during the second cycle on the closed side of the C-shaped supporting frame 53, whereby sufficient space must be provided for the processing device, while the completed component is removed on the open side during the fourth cycle.

The mold mounting plates 6, 7 and 62, 63 of the afore-described mold closing devices 1, 30, 50 can be displaced hydraulically or electromechanically via spindle drives. In principle, a C-shaped supporting frame 53 that is fixedly secured in the machine frame and has an opening that is open towards the loading/unloading side, can also be used in the mold closing device 1 where the two mold mounting plates 6 and 7 can be moved (opening, closing, loosening) hydraulically or electromechanically when the locking system (saw tooth-shaped grooves 22, half-shells 23, 24) is open and where the closing pressure is produced via hydraulic pressure pistons 12 in the left mold mounting plate 6 that is formed as a sandwich plate.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A mold closing device of an injection molding machine for producing plastic parts made of two or more plastic components, comprising:

two outer mold mounting plates supporting mold halves;

a center mold carrier element rotatingly arranged between the two outer mold mounting plates;

a C-shaped supporting frame supporting the rotating center mold carrier element and including an opening that is open towards a loading/unloading side of the injection molding machine;

a machine frame fixedly connected to the supporting frame and displaceably supporting the outer mold mounting plates.

2. The mold closing device of claim 1, wherein the mold carrier element is constructed in the form of a cube and provided with four mold mounting areas for four center mold halves, and further comprising at least one processing unit for performing processing steps on a finished plastic part that is located in the mold half facing the opening of the C-shaped supporting frame.

3. The mold closing device of claim 1, wherein one of the mold mounting plates is configured as a sandwich plate comprising a mold carrier plate and a support plate in spaced-apart parallel relationship to the mold carrier plate, and further comprising a toggle lever closing system disposed between the support plate and the mold carrier plate.

4. The mold closing device of claim 1, wherein one of the mold mounting plates is configured as a sandwich plate comprising a mold carrier plate and a support plate in spaced-apart parallel relationship to the mold carrier plate, and further comprising a closing system with a hydraulic pressure piston disposed between the support plate and the mold carrier plate.

5. The mold closing device of claim 1, wherein the C-shaped supporting frame has an upper horizontal leg and a lower horizontal leg, and further comprising a vertical leg connecting the horizontal legs.

6. The mold closing device of claim 1, wherein the C-shaped supporting frame has horizontal legs provided with slideways, with at least two columns extending through the horizontal legs.

7. The mold closing device of claim 6, wherein one end of each column is fixedly secured on one of the outer mold mounting plates and the other end of the column includes a piston, which is reversibly guided in a cylinder unit that is connected with the other one of the outer mold mounting plates, said piston and cylinder unit forming an actuating unit configured to execute an opening and closing motion of the mold closing device and to produce a closing pressure of the mold closing device.

* * * * *